Aug. 26, 1941.                W. M. AFRICA                2,253,598
                          PACKAGE FOR FISHERMEN
                           Filed June 27, 1939
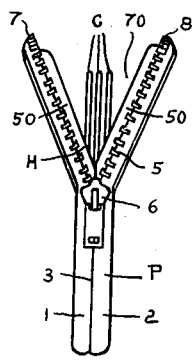
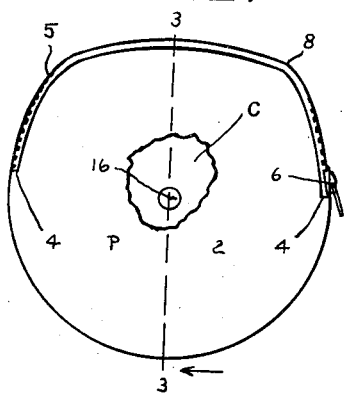
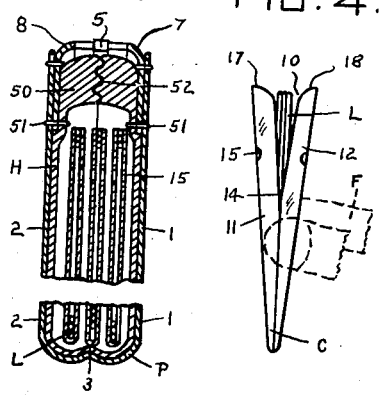
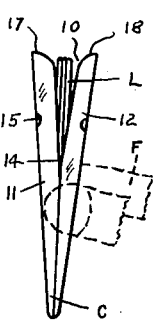
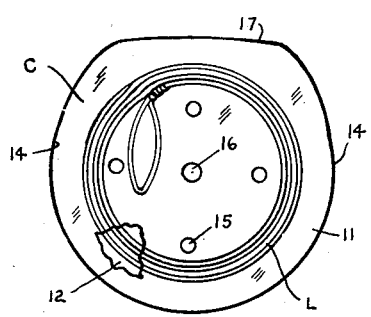
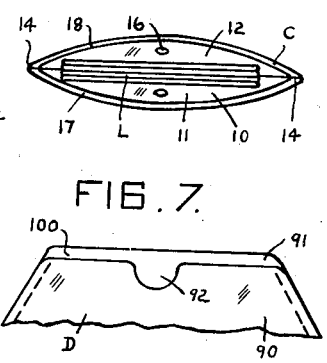
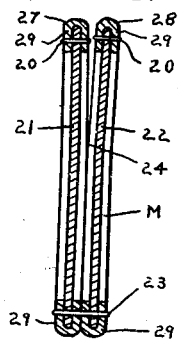
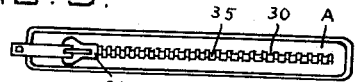
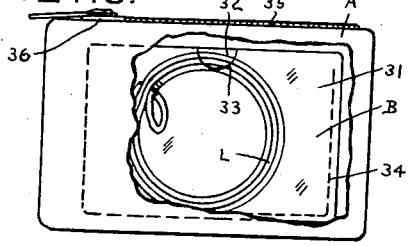
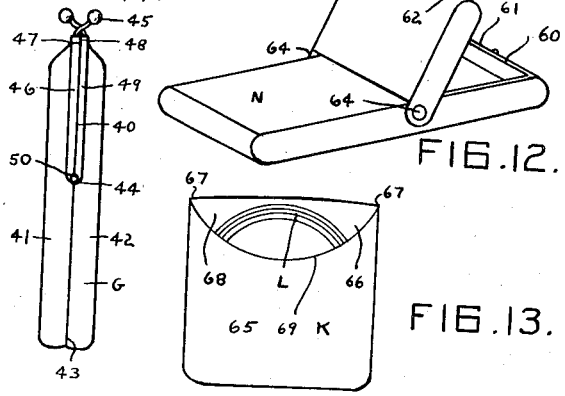
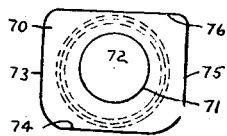
INVENTOR.
Walter M. Africa
Gardner D. Bascor
ATTORNEY.

Patented Aug. 26, 1941

2,253,598

UNITED STATES PATENT OFFICE 2,253,598

PACKAGE FOR FISHERMEN

Walter M. Africa, Manchester, N. H.

Application June 27, 1939, Serial No. 281,395

8 Claims. (Cl. 43—32)

This invention is a package including one or more cases for the convenient use of fishermen in carrying, handling and preserving leaders for fish lines.

In fishing for trout or other fish, it is now customary to use in connection with a rod and line, several of what are known as leaders. Each leader is from three to eighteen feet long. Some are what are known as "level" leaders, while others are tapered from the large end, which is attached to the line, to the small end to which the fly or hook is attached. When a hook with or without a fly is changed, the end of the leader is untied from the hook or cut off. Several leaders of the same or different sizes or material are usually carried.

These leaders are made of cat gut, rayon, or other material, and when in use should be flexible but without losing their strength. To be in the best condition for use, they should be moistened and kept moist up to the time of use. When being carried and at all times, they should be kept separate from other leaders to prevent tangling. If not in use for several days or for the winter, they should be dried before they are stored away, otherwise they are likely to mildew.

For the convenient use of the fisherman, he should have a number of these leaders, each in good, moist, flexible condition, in his pocket, preferably in some sort of a flat pouch in which he can see the different kinds and from which he can quickly and easily select the particular leader for the particular time and place.

These leaders can easily be wound into a flat coil, and this invention includes a pouch which is preferably of a shape and size to easily fit in a pocket, with a mouth having lips which extend well down on each edge, the mouth being closed by a fastener, preferably of the slide type. The pouch is water proof or has a water proof lining, the mouth of which is so made that when closed, it will prevent any substantial amount of water from leaking out into the pocket.

I provide one or more flat cases, which are preferably transparent and which can be conveniently made of Celluloid, or other similar tough, fairly stiff, waterproof material, each of a size to fit in the pouch and to receive a coiled leader and each having a mouth, similar to that of the pouch, which extends well down on each edge. Preferably, each case is made with one or more ventilating holes so that when immersed in water, the water will penetrate between the front and back and so that some of it will remain on the inside until the leader is softened.

When it is necessary to dry the leader, each case with a leader in it can be taken out and allowed to dry before it is stored away, the leader at all times remaining in the case, except when in actual use by the fisherman. The ventilating hole or holes allow the air to get in and the moisture to get out.

Preferably, each case is made of transparent material, but other similar non-transparent material can be used, provided it is stiff enough to hold its shape, waterproof and preferably elastic.

In the drawing,

Fig. 1 is an end elevation of my complete package with the mouth of the pouch open to expose the cases on the inside.

Fig. 2 is a front elevation of my package with the mouth of the pouch closed and parts broken away to show a case on the inside.

Fig. 3 is a vertical section on the line 3—3 of Fig. 2 very much enlarged.

Fig. 4 is an end elevation of an inside case as it appears when pressed together between the thumb and finger, shown dotted, to remove a leader.

Fig. 5 is a front elevation of my preferred form of transparent leader case with parts broken away to show the inside.

Fig. 6 is a top view of the case shown in Fig. 5 exaggerated to show the normal semi-open position of its mouth.

Fig. 7 is a front elevation showing the top of a modified form of case.

Fig. 8 is a vertical sectional view with the thickness of the walls greatly exaggerated to show another construction of a case.

Fig. 9 is a top view of a modified type of pouch.

Fig. 10 is an elevation of the same pouch shown in Fig. 9 with a modified type of case inside.

Fig. 11 is an end elevation of another modified type of pouch and Fig. 12 is an isometric view of another type of pouch.

Fig. 13 is an elevation of another modified type of case and Fig. 14 is still another elevation of another modified type of case.

In Figs. 1, 2, 3, 4, 5 and 6 of the drawing, P represents a pouch which, as shown, is formed of two pieces 1 and 2 of leather, or similar material, sewed together at 3 up as far as the ponts 4, 4 which, preferably, are slightly above the middle. The lower part of this is preferably curved, as shown, as is the lower part of case C.

From the points 4, 4, the sides are separated to form a mouth 70 with the lips 7 and 8. These lips are shown as provided with a sliding closure device, such as what are known as zippers, at 5, 5 with a sliding plow 6 of well-known construction.

Preferably as shown in Fig. 3, this pouch has a lining H. Preferably, this lining H is made of molded rubber, or other similar water-proof material, and the bottom conforms to the inside shape of pouch P. At the top, it is provided with a bead 50 which extends all the way around each lip 7 and 8 right down around the points 4, 4 where the lips separate. This lining H, as shown, is stitched at 51 to the pouch, but it might be fastened by an adhesive or in any other way. Preferably, the bead is corrugated, as shown at 52, so that when the mouth of the pouch is closed by the closure 5 and 6, the raised part of the corrupations engage the depressions, thus making a completely water tight joint. When the mouth is open, the lips 7 and 8 fall apart or can be pressed apart, giving ready access to the inside.

In the pouch P, I provide one or more flat transparent cases C which can be conveniently made of Celluloid, or other similar tough transparent material. Preferably, each of these is molded in one piece and preferably the front and back walls 11 and 12 of each case are round at the bottom to conform in a general way with the bottom of pouch P and are connected up to the points 14, 14 which are preferably slightly above the middle.

The front and back walls 11 and 12 are preferably perforated by a plurality of small holes 15 and 16 so that water can get inside to soften the leader and so that moisture will evaporate when the case is taken out to be dried.

Above or beyond the points 14, 14, the front and back walls 11 and 12 are not attached, thus forming an open mouth 10 with the lips 17 and 18. These lips preferably taper slightly toward the top away from the points 14, 14. Each case C is of a size to receive a single coiled leader L.

When the pouch P is opened, its lips 7 and 8 separate or can be separated and one of the cases C with its leader is partly exposed and can readily be taken out. As the purpose of the case is to retain moisture and liquid, such as water, there is a tendency for the front and back walls to stick together. However, as shown in Fig. 4, when pressure between the thumb and finger F is exerted at the points 14, 14, the mouth 10 opens.

The points 4, 4 at the edges of the pouch P and 14, 14 at the edges of each case C are at the ends of the mouths 70 and 10 and their positions determine the size of the mouth.

The presence of the leader L has a tendency to separate the middle of the front and back walls 17 and 18, as shown in Fig. 6. I find it desirable, when first made, to curve the front and back outwardly so as to make the natural shape of the entrance to the mouth, as shown in Fig. 6. Pressure between the thumb and finger, such as F as shown in Fig. 4, opens the mouth still more.

However, to be sure of easy opening, I can, as shown in Fig. 7, form the front and back walls 90 and 91 at the mouth 100 of a case D so that one edge of wall 91 extends beyond the edge of the other wall 90. I may also use a finger cut 92 at the top of the other edge 90, or I may use either one of these expedients.

To reduce the cost, instead of molding each case, I can use a flat transparent case M, such as shown in Fig. 8, made of two thin flat sheets of Celluloid to form front and back walls 21 and 22, the edges of which are bound with tape 29, shown as sewed on at 20 all the way around. The bottom part of the case M up to the points 24, 24 are sewed together at 23 so that the lips 27 and 28 of the mouth are open. This tape 29 also keeps the walls 21 and 22 separated so that there is no need of either expedients, such as shown in Figs. 6 or 7.

As shown in Figs. 9 and 10, instead of a pouch shaped as shown at P, I can use a substantially rectangular pouch A with a mouth 30 which does not extend all the way across the top but is closed by a slide fastener, such as 35, with a plow 36 of the well-known zipper type.

Each case B for each leader L can be made of two substantially rectangular transparent sheets of Celluloid, or similar material, 31 and 32 stitched together at 34 and having a finger cut 33 for convenient opening. The holes for the stitches and the space at the edges provide sufficient ventilation.

Instead of using slide fasteners, I may, as shown in Fig. 11, use a pouch G made entirely of waterproof material formed with front and back walls 41 and 42 fastened together in any suitable manner at the bottom 43 up to the points 44, 44, the rest being formed as a mouth 40 with lips 47 and 48 which are attached to metal members 46 and 49 pivoted at 50 and provided with a well-known type of snap closure 45. This construction may not be completely waterproof but, if the pouch is kept right side up, is satisfactory.

Another modification of my idea is shown in Fig. 12 in which N is a flat pouch which may be made of metal, hard rubber, Celluloid or of any other suitable material. It has a mouth 60 extending between the points 64, 64 at each edge and has a fixed lip 61 and a movable lip 62 pivoted at 64, 64. Mouth 60 may have a suitable locking device, such as shown at 63, and is substantially waterproof.

Pouch N contains one or more leader cases, such as K, shown in Fig. 13, shown as made of any suitable tough sheet material which is not transparent, this material forming a front 65 and back 66, the front 65 being cut so as to expose a substantial part of the back 66. The mouth 68 extends across the top between the points 67, 67 at the top of each edge. By pressing upon these points 67, 67, the mouth opens so that the thumb and fingers of the other hand can reach in to extract a leader L.

The cut 69 of front 65 can be so made as to expose part of a leader L but the exposed part tends to dry and stiffen and the length of the leader cannot be seen as well as if the case is transparent.

I may use a case, such as shown in Fig. 14, made of a front 70 with a large hole 71 in the center and a back 72 without a hole, the front and back being pressed and stuck together at their rims 73, 74 and 75, leaving a mouth 76 between 73 and 75.

I claim:

1. In a package for fishermen, the combination of a flat pouch having a mouth with lips which extend well down on each edge and which is closed by a fastening slide, said pouch having an inside waterproof lining with closure lips extending proximate and inside the mouth whereby the pouch is leaktight; with a flat, transparent case inside the pouch, said case having ventilating holes and a mouth with lips which extend well down on each edge.

2. In a package for fishermen, the combination of a flat pouch having a mouth with lips which extend well down on each edge and which is closed by a fastening slide, said pouch having an inside waterproof lining with closure lips extending proximate and inside the mouth whereby the pouch is leaktight; with flat cases inside the pouch, said cases having ventilating holes and a mouth with lips which extend well down on each edge.

3. In a package for fishermen, the combination of a flat waterproof pouch having a mouth with lips which extend well down on each edge and which mouth is provided with fastening means; with flat transparent cases inside the pouch, each case having a ventilating hole and a mouth with lips which extend well down on each edge.

4. In a package for fishermen, the combination of a flat, waterproof pouch having a mouth with lips which extend well down on each edge and which mouth is provided with fastening means; with a flat case inside the pouch having a ventilating hole and a mouth with lips which extend well down on each edge.

5. In a package for fishermen, the combination of a flat pouch, the inside of which is substantially waterproof, and having a mouth provided with fastening means; with flat cases inside the pouch, said cases having ventilating holes and a mouth with lips which extend well down on each edge.

6. In a package for fishermen, the combination of a flat pouch, the inside of which is substantially waterproof, and having a mouth provided with fastening means; with a flat, transparent case inside the pouch, said case having ventilating holes and a mouth with lips which can be opened.

7. In a package for fishermen, the combination of a flat, waterproof pouch having a mouth with lips which extend well down on each side edge and which mouth is provided with fastening means; with a bodily removable, flat transparent leader case, formed of front and back walls, the side edges of which are close together and the body parts of which are spaced, the case having a mouth with lips which extend well down on each side edge.

8. In a package for fishermen, the combination of a flat, waterproof pouch having a rounded bottom and a mouth at the top with lips which extend well down on each side edge and which mouth is provided with fastening means; with a bodily removable, flat transparent leader case, formed of front and back walls, the side edges of which are close together and the body parts of which are spaced, the case having a rounded bottom to substantially fit the bottom of the pouch and having at the top a mouth with lips which extend well down on each edge.

WALTER M. AFRICA.